US005836573A

United States Patent [19]

Hayashi et al.

[11] Patent Number: 5,836,573

[45] Date of Patent: Nov. 17, 1998

[54] CLAMPING DEVICE

[75] Inventors: Takehiko Hayashi, Toyota; Takaaki Hayashi, Kariya; Sentarou Sugita, Nagoya; Takeshi Nishikayama, Kariya, all of Japan

[73] Assignee: Toyoda Koki Kabushiki Kaisha, Kariya, Japan

[21] Appl. No.: 773,309

[22] Filed: Dec. 24, 1996

[30] Foreign Application Priority Data

Dec. 26, 1995 [JP] Japan .................................... 7-339450

[51] Int. Cl.[6] ........................................ B23Q 3/00

[52] U.S. Cl. ................................ 269/20; 269/25; 269/32; 269/37; 269/24

[58] Field of Search ................................ 269/20, 25, 32, 269/27, 37, 24, 900

[56] References Cited

U.S. PATENT DOCUMENTS

| | | | |
|---|---|---|---|
| 3,491,996 | 1/1970 | Ohrnberger | 269/25 |
| 3,572,216 | 3/1971 | Seesody | 269/32 |
| 4,508,327 | 4/1985 | Ersoy | 269/27 |
| 4,560,152 | 12/1985 | Miller | 269/27 |
| 4,620,695 | 11/1986 | Vanistendael | 269/32 |
| 5,161,788 | 11/1992 | Guzzoni | 269/27 |
| 5,192,058 | 3/1993 | VanDalsem et al. | 269/32 |
| 5,437,440 | 8/1995 | Keaton | 269/32 |

FOREIGN PATENT DOCUMENTS

| | | |
|---|---|---|
| 63-94639 | 6/1988 | Japan . |
| 6-39684 | 2/1994 | Japan . |
| 7-70169 | 2/1995 | Japan . |

*Primary Examiner*—James G. Smith
*Assistant Examiner*—Lee Wilson
*Attorney, Agent, or Firm*—Oblon, Spivak, McClelland, Maier & Neustadt, P.C.

[57] ABSTRACT

A clamping system has a clamping device inserted in an installing hole formed in a fixture base, a cylinder unit for operating a clamp and a detection unit for detecting operation positions of the clamp, both of which are formed in the clamping device. In the fixture base, there are formed clamping fluid supplying passages for supplying clamping fluid and detection fluid supplying passages for supplying detection fluid, in which pressure switches are provided. And also, in the clamping device, there are formed detection fluid supply passages and clamping fluid supply passages. When the clamping device is inserted into an installing hole formed in the fixture base, the clamping fluid supplying passages are communicated with clamping fluid supply passages, and also the detection fluid supplying passages is communicated with the detection fluid supply passages through nozzles formed in the cylinder unit. The nozzles are opened and closed due to a movement of a piston formed in the cylinder unit, so that air pressures in the detection fluid supplying passages change, and operation states of the clamp is detected. Further, each of the units is constructed as a unit, so that it is easy to change the setup due to different workpieces.

8 Claims, 7 Drawing Sheets

CLAMPING DEVICE

BACKGROUND OF THE INVENTION

1. Field of the Invention

The present invention relates to a clamping device used in a machine tool for clamping a workpiece.

2. Description of the Background

In a clamping device which is arranged on a fixture base provided with a machine tool, a workpiece mounted on a standard sheet and positioned by a knock pin is clamped on the standard sheet by several clamps operated by cylinder units, for example. In such a clamping device, there is provided a detection unit for detecting the end of operation of each of the clamps.

Conventionally, in the case that the cylinder units of the clamping devices are permanently provided in the fixture base, it is not easy to change the setup in accordance with workpieces having different sizes. In Japanese Unexamined Patent Publication (KOKAI) No. 63-94639, to solve such a problem as described above, it is disclosed that the clamping device having the cylinder unit takes the form of a cassette mounted to the fixture base. The ease of assembly of the clamping device onto the fixture base is thereby improved.

Moreover, in the detection unit, it is known to provide a proximity dog with an operation axis cooperating with a movement of the clamp in order to detect an end operation of the clamp. A proximity switch having an electronic contact therein operates by contact with the proximity dog. In this detection unit, the contact of the proximity dog with the proximity switch is performed at a position where cutting waste does not cover the proximity dog and the proximity switch (e.g. above a machining point) through a link mechanism or the like. However, such a mechanism has the problems of increased cost and term of design, machining and assembling therefor due to the complexity of the mechanism with an increase of the number of parts used therein.

Therefore, in a technique described in Japanese Unexamined Patent Publication (KOKAI) No. 6-39684, a detection adaptor forming several nozzles connected to an air supply is arranged to the fixture base. The air nozzle is closed by an outer surface of an operation axis at a position corresponding to an operation end of the operation axis cooperating with the movement of the clamp, so that the air pressure in an air passage for connecting the air supply with the air nozzle is detected by a pressure switch arranged in the middle of the air passage. It is thereby possible to detect clamp and unclamp states due to a rise of the inside pressure in the air passage. According to this design, the clamp or unclamp state is detected by the pressure switch provided in the air passage regardless of whether the unit is covered with the cutting waste, so that the reliability for detecting the operation state (clamp or unclamp) is improved.

Japanese Unexamined Patent Publication (KOKAI) No. 6-39684 has the advantage of the improved reliability, however, since the detection adaptor is independent from the detection unit, this technique has such a problem that it is difficult to change the setup in accordance with change of the workpiece size. Moreover, the number of the parts for such a link mechanism increases in correspondence with a variety of the workpiece sizes and this causes the cost and time of the design, machining and assembly for the mechanism to be increased.

SUMMARY OF THE INVENTION

Accordingly, an object of the present invention is to provide a clamping device which is easily adaptable to various sizes of workpieces.

Another object of the present invention is to provide an clamping device which can facilitate design change and can be easily assembled.

Briefly, according to the present invention, a clamping system is composed of a clamping device inserted in an installing hole formed in a fixture base, a cylinder unit for operating a clamp and a detection unit for detecting operation positions of the clamp, both of which are formed in the same clamping device. In the fixture base, there are formed clamping fluid supplying passages for supplying clamping fluid and detection fluid supplying passages for supplying detection fluid. Pressure switches are provided in the detection supplying passages. Detection fluid supply passages and clamping fluid supply passages are also formed in the clamping device. When the clamping device is inserted into an installing hole formed in the fixture base, the clamping fluid supplying passages in the fixture base are communicated with clamping fluid supply passages in the clamping device, and also the detection fluid supplying passages in the fixture base are communicated with the detection fluid supply passages in the clamping device through nozzles formed in the cylinder unit.

According to this construction, by simply inserting the clamping device into the installing hole, the communication of the detection fluid and the clamping fluid from the fixture base to the clamping device is established. Therefore, both the cylinder unit and the detection unit are operated. In this situation, when the clamping fluid is supplied to one of chambers of the cylinder unit, the clamp moves upward or downward. With this movement, the workpiece is clamped or unclamped by the clamp. At that time, the nozzles are opened or closed corresponding to the movement of the clamp, so that the air pressure in the detection fluid supplying passage rises. The rising of the air pressure is detected by one of the pressure switches, so that the operation of the clamp is confirmed.

Further, the nozzles are formed in a cylinder cap of the cylinder unit, and openings are formed in a bar of a piston rod of the cylinder unit. In this construction, the nozzles are communicated with said detection fluid supply passages in the clamping device through the openings due to the movement of the piston of the cylinder unit in which the nozzles are formed.

With this construction, the operation state of the clamp is detected in the piston of the cylinder unit.

Therefore, in case that the stroke of the clamper is extended, the piston is overlapped with the cylinder cap, and the clamping device can be made compact.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
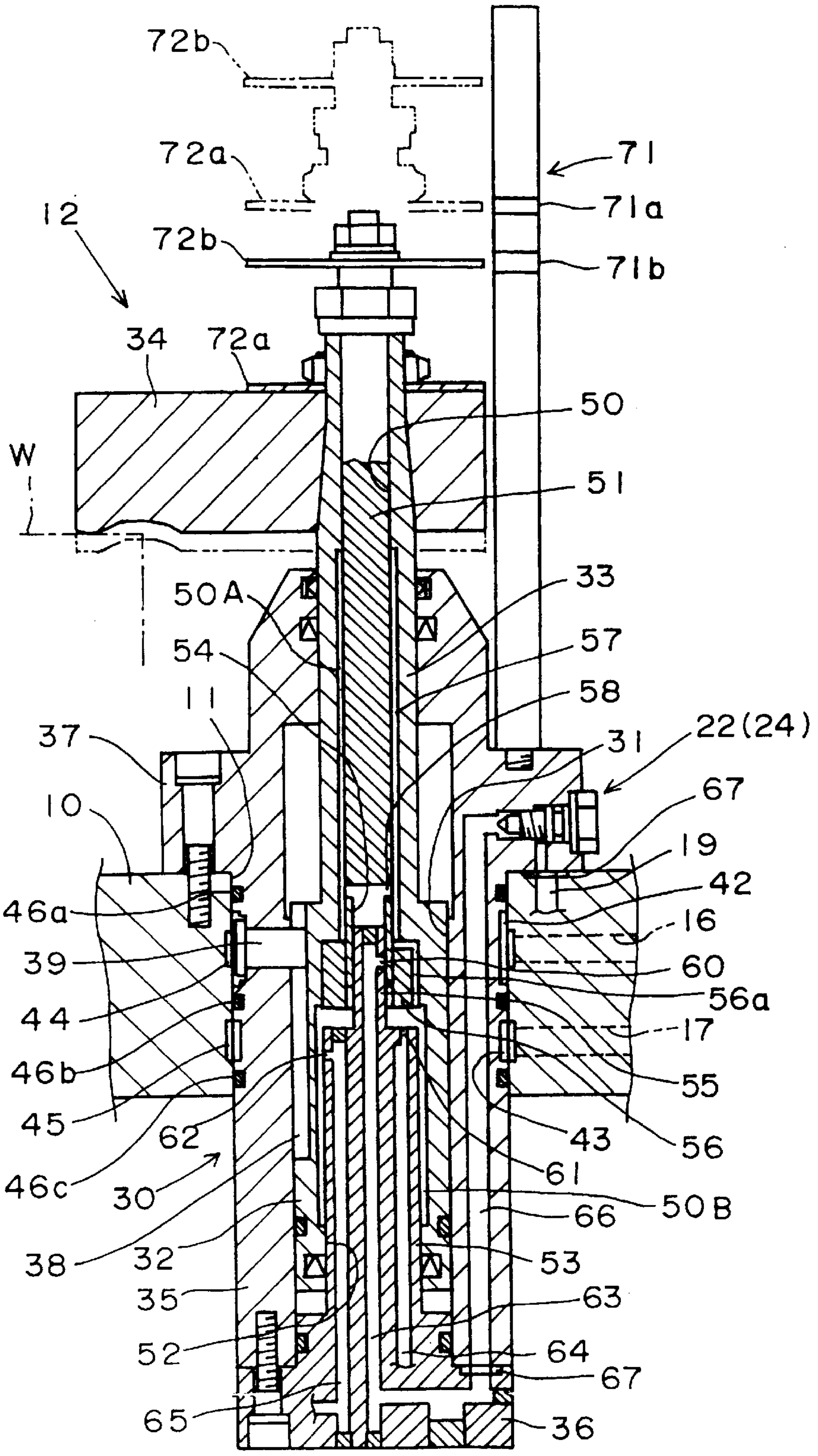
FIG. 1 shows a cross-sectional view of a clamping device in a first embodiment according to the present invention.

Referring now to the drawings, wherein like reference numerals designate identical or corresponding parts throughout the several views, A first embodiment according to the present invention will be described with reference to FIG. 1 to FIG. 5.

In FIG. 1, numeral 10 denotes a fixture base mounted on a bed of a machine tool, in which several installing holes 11 are formed. Clamping devices 12 according to the present invention are inserted in the installing holes 11, respectively.

The clamping device 12 consists of a main body 30 fixed to the fixture base 10, a cylinder 31 for clamping provided with within the main body 30, a piston 32 slidably inserted in the cylinder 30, and a clamp 34 fixed to a piston rod 33 of the piston 32.

The main body 30 includes a cylindrical member 35 inserted into the installing hole 11 of the fixture base 10 and a cylinder cap 36 secured at a lower end portion of the cylindrical member 35. A jaw portion 37 formed on the cylindrical member 35 is secured to the fixture base 10 by means of a bolt, whereby the main body 30 of the clamping device 12 is fixed to the fixture base 10.

The piston 32 is slidably movable upward and downward by a predetermined stroke into the clamping cylinder 31 and the piston rod 33 is connected to a top end portion thereof. The piston rod 33 extends outward of the main body 30, and the clamp 34 is secured to the external end of the piston rod 33.

The piston 32 forms a key lead 38 extending in an axial direction, and a key 39 fixed to the cylinder 31 is slidably fitted in the key lead 38. Accordingly, the piston 32 is prevented from rotating by the key 39, thereby being able to move only in the axial direction. In this embodiment, the piston 32 is permitted to move only in the axial direction by the key 39. However, by forming the key lead 38 in the form of spiral, the clamp 34 may be caused to rotate between predetermined upper and lower end positions.

Figure 2:
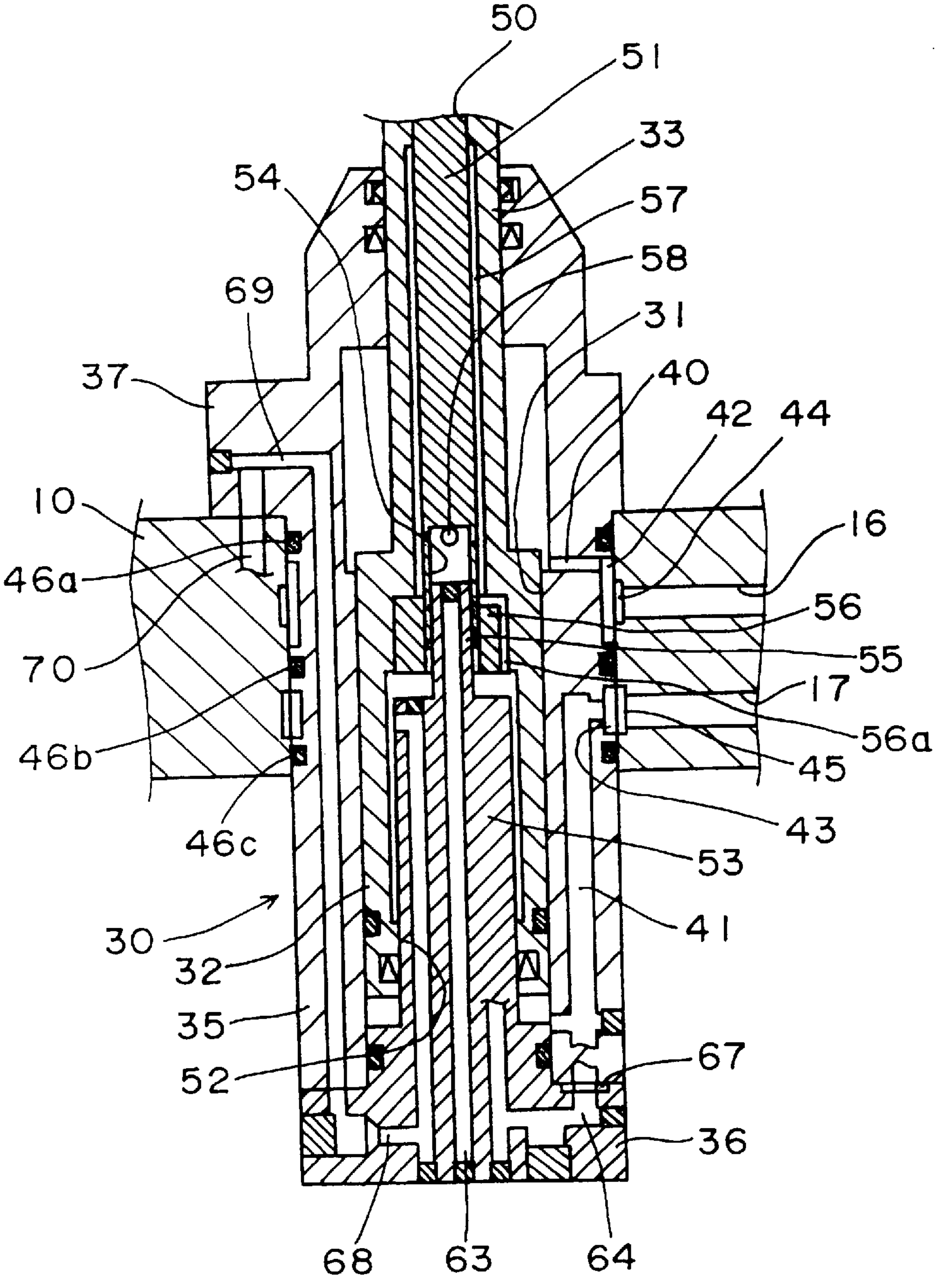
FIG. 2 is another cross-sectional view of the clamping device in the first embodiment according to the present invention.
Figure 4:
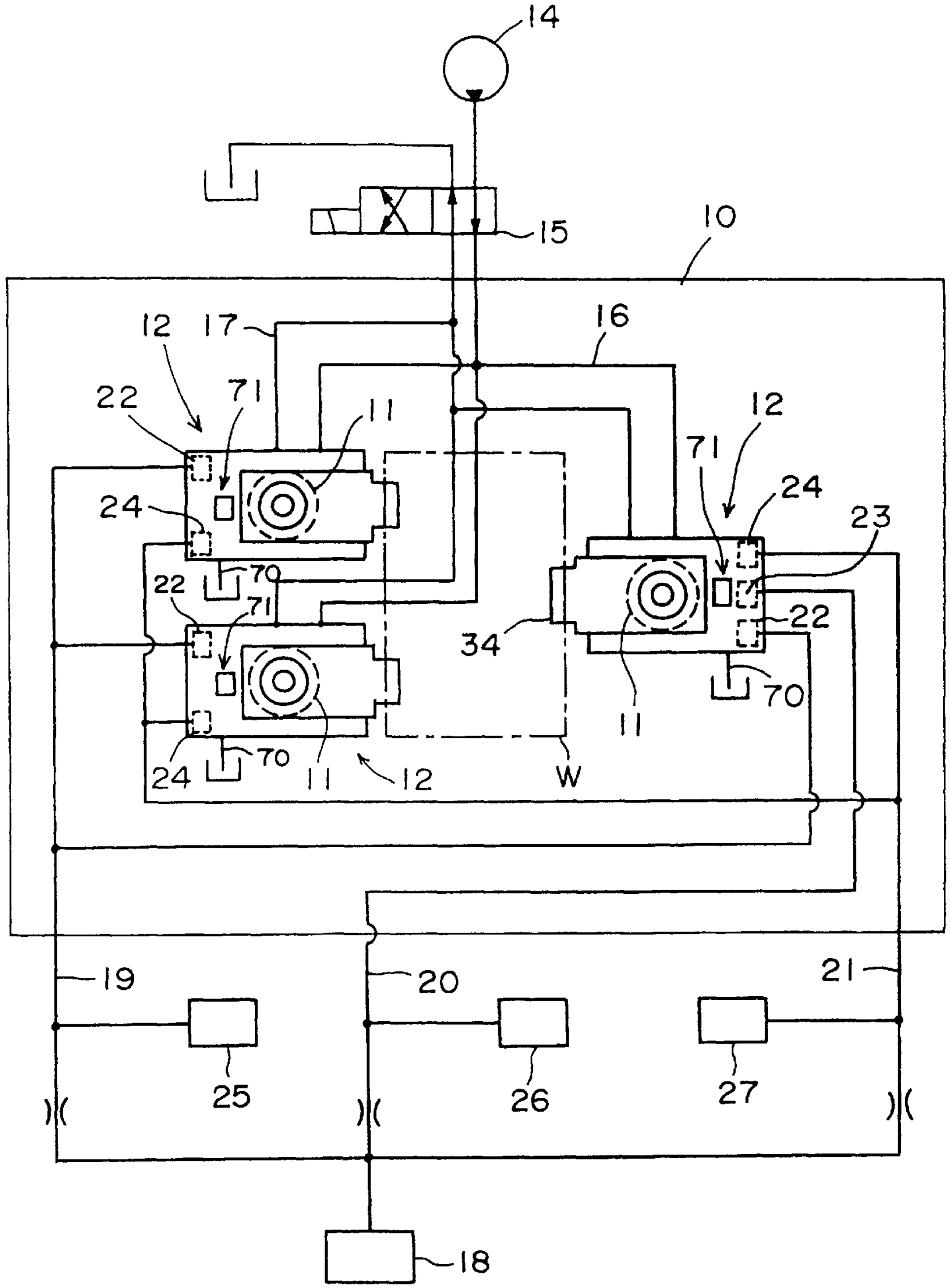
FIG. 4 is an oil pressure and air circuit diagram for the clamping device.

As shown in FIG. 2, the chambers formed at both ends of the piston 32 in the clamping cylinder 31 are respectively connected to the ends of oil passages 40 and 41 formed in the main body 30. The other ends of the oil passages 40 and 41 are communicated with oil passages 16 and 17 formed in the fixture base 10. As shown in FIG. 4, an oil pressure pump unit 14 may be selectively connected to the oil passages 16 and 17 through an electromagnetic direction control valve 15 provided in the middle of the oil passages 16 and 17, respectively.

Referring back to FIG. 2, the oil passages 16 and 17 communicate from annular grooves 42 and 43 in the main body 30 through annular grooves 44 and 45, respectively, in the fixture base 10. The oil grooves 42, 43, 44 and 45 are fluidly hermetically sealed by seal rings 46*a*, 46*b* and 46*c* arranged at the outer surface of the cylindrical member 35. Accordingly, when the main body 30 of the clamping device 12 is disposed in the installing hole 11 of the fixture base 10, the annular grooves 42 and 43 are respectively positioned at positions corresponding to the annular grooves 44 and 45, whereby the connections of the oil passages 16 and 17 with the oil passages 40 and 41 are established, respectively.

As shown in FIG. 4, the clamping devices 12 are brought into an operable condition by mounting each of the clamping devices 12 into one of a plurality of the installing holes 11 (e.g., the example in FIG. 4 represents the case of three holes) formed at predetermined positions of the fixture base 10, respectively. As shown by a chain line in FIG. 1, in case that the workpiece W is carried on the fixture base 10, when the cylinder mechanisms are operated, the workpiece W is clamped by each of the clamps 34 of the clamping devices 12.

In the piston rod 33, there is formed an inserting bore 50 in which an adjustable rod 51 for detecting a clamping position is disposed. A first sleeve 52 formed in the piston 32 extends in the axial direction of to the inserting bore 50, and a first cylindrical member 53 provided at an upper end portion of the cylinder cap 36 is slidably inserted in the first sleeve 52.

At a lower portion of the adjustable rod 51, there is formed a second sleeve 54 in which a second cylindrical member 55 formed at an upper end portion of the first cylindrical member 53 is slidably disposed.

Moreover, a contact member 56 slidably engaged on an outer surface of the lower portion of the adjustable rod 51 is mounted to the piston rod 32, and the contact member 56 contacts an upper end surface of the first cylindrical member 53 for detecting an over-stroke when the piston 32 is stroked downward (in a clamping direction) past the clamping position. A communication air passage 56*a* is formed on an outer surface of the contact member 56.

Two annular openings 50A and 50B are formed between the inserting bore 50 and the first sleeve 52, and the adjustable rod 51 and the first cylindrical member 53, respectively. One of the openings 50A is communicated with the other opening 50B through the communication passage 56*a*, and a drain space 57 is composed of the two openings and the communication passage 56*a*.

A radially extending passage 58 is formed in an upper portion of the second sleeve 54. The interior of the second sleeve 54 is communicated with the drain space 57 therethrough.

In the cylinder cap 36, there are formed a clamping detection air nozzle 60 opening into an outer surface of the second cylindrical member 55, an over-stroke detection air nozzle 61 opening into an upper surface of the first cylindrical member 53, and an unclamping detection air nozzle 62 opening into the outer surface of the first cylindrical member 53, respectively.

The air nozzles 60, 61 and 62 are located at ends of air passages 63, 64 and 65 formed in the cylinder 36, respectively. On the other hand, the other ends of the air passages 63, 64 and 65 are respectively connected to an air passage 66 formed in the main body 30 of the clamping device 12 (the connections of the air passages 64 and 65 with the air passage 66 is omitted in each drawing), and from there through the air passages 19, 20 and 21 to the air supply 18, as shown in FIG. 4.

Valves 22, 23 and 24 for opening and closing the air connection are provided in the air passages 19, 20 and 21, formed in the fixture base 10, which connect with the air passages 63, 64 and 65 through the air passage 66, respectively. In the air passages 19, 20 and 21, there are arranged air pressure switches 25, 26 and 27 for detecting a pressure rise in the air passages 19, 20 and 21 to confirm the clamp, over-stroke and unclamp operations, respectively. As shown in FIG. 4, the over-stroke detection air nozzle 60 and the valve 23 for closing the air passage 20 maybe provided with one of the clamping devices 12, because the detection of the over-stroke operation confirms whether the workpiece W is or is not installed on the fixture base 10. Therefore, the installation of the workpiece W can be confirmed by recognizing an operation state in only one of the clamping devices 12.

The air pressure switches 25 and 27 are connected to each of the plurality of clamping device 12, so that only one air pressure switch 25 or 27 is provided for the detection of clamp or unclamp. When the operation, e.g., the clamp operation, finishes in all of the clamping devices 12, the air pressure in the air passage increases. At that time, the air pressure switch is operated, so that completion of the operation is detected.

Figure 3:
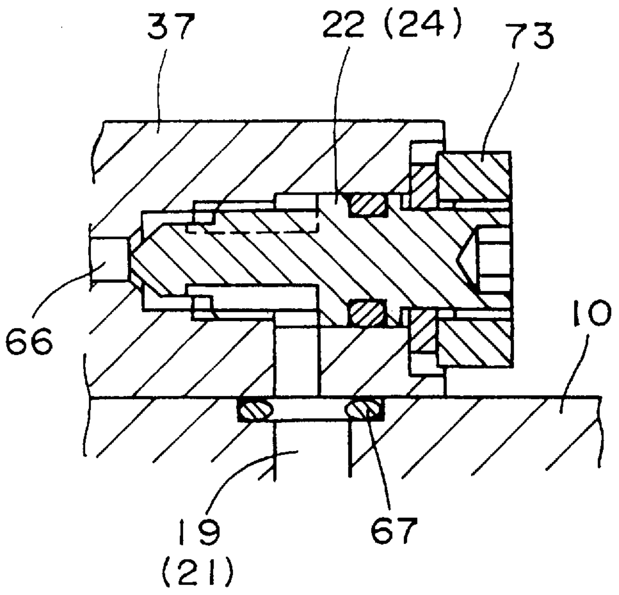
FIG. 3 is an enlarged view of a part of the clamping device shown in FIG. 1.

As shown in FIG. 3 in detail, the valve 22 (24) is threaded into the jaw portion 37 of the main body 30. It is adjustable the valve 22 (24) from outside of the main body 30 by rotation, so that the air passage 19 (21) can be opened and closed. In FIG. 3, numeral 73 denotes a lock nut.

At connecting portions between the air passages 19, 20 and 21, the air passages 63, 64 and 65, and the air passage 66, there are provided seal rings 67.

In the first cylindrical member 53 of the cylinder cap 36 shown in FIG. 3, there is formed a drain passage 68 opening into one end of the air drain space 57 in which the other end is connected to a drain passage 70 in the fixture base 10 through a drain passage 69.

As shown in FIG. 1, when the workpiece W is clamped normally, i.e., at a retracted position (lower end position) of the piston 32 clamping the workpiece W by the clamp 34, the air nozzle 60 is closed by the second sleeve 54. In this situation, the other air nozzles 61 and 62 are drained through the air drain space 57.

On the other hand, upon raising the piston 32, the workpiece W is unclamped and the air nozzle 62 is closed by the first sleeve 52. In this situation, the other air nozzles 60 and 61 are drained through the air drain space 57, as shown FIG. 5.

In case that no workpiece W is provided, the lower surface of the clamp 34 is over-stroked to a position presented by a double chain line in FIG. 1. At this time, the air nozzle 60 is closed by an inner surface of the second sleeve 56, and also the air nozzle 61 is closed by a lower end surface of the contact member 56 fixed to the adjustable rod 51. Therefore, only the air nozzle 62 is drained through the air drain space 57.

As described above, a clamp-unclamp operation detection unit is composed of the air nozzles 60, 61 and 62, the air passage 66 connecting the air nozzles 60, 61 and 62 with the air passages 19, 20 and 21 in the fixture base 10, the first and second sleeves 52 and 54 and the contact member 56 which closes the air nozzle 61. The clamp-unclamp operation detection unit also includes the air drain space 57 for draining the air and the drain passages 68 and 69. The clamp-unclamp operation detection units can be provided for each of the clamping devices 12 installed in the installing holes 11.

In FIG. 1, numeral 71 denotes a guage for detecting the operation position, on which an unclamp designating range 71*a* and a clamp designating range 71*b* are formed. Designating plates 72*a* and 72*b* are provided on the piston rod 33. When the designating plate 72*a* stops at a position corresponding to the unclamp designating range 71*a*, the unclamp operation is confirmed, while the clamp operation is confirmed when the designating plate 72*b* stops at a position corresponding to the clamp designating range 71*b*. As constructed above, each of the unclamp and clamp operations can be visually confirmed by an operator, so that it can be discovered if one of the clamping devices 12 breaks.

Next, the operation in the construction described above will be explained.

As shown in FIG. 1, in case that the clamp 34 is to clamp the workpiece W, the pressurized oil is supplied from the oil pressure pump unit 14 to the upper chamber of the cylinder 31 through the oil passage 16, the annular grooves 44 and 42, and the oil passage 40, whereby the piston 32 is pushed downward. In this state, the second cylindrical member 55 formed on the cylinder cap 36 is disposed in the second sleeve 54 formed on the adjustable rod 51 and therefore the air nozzle 60 formed in the second cylindrical member 55 is closed by the inner surface of the second sleeve 54. When this state is established in a plurality of the clamping devices 12, the air pressure in the air passage 63 connected to the air supply unit 18 increases, and the clamp operation is confirmed by detecting the increase of the air pressure using the air pressure switch 25. At that time, the other air nozzles 61 and 62 are drained through the air drain space 57, so that the air pressures in the air passages 64 and 65 do not increase, whereby the air pressure switches 26 and 27 are not operated.

After it is confirmed that the workpiece W is clamped in this manner, a predetermined machining on the workpiece W may be carried out by the machine tool (not shown). Subsequent to the machining of the workpiece W, the electromagnetic direction control valve 15 is changed according to an unclamp instruction, so that the pressurized oil is supplied to the lower chamber of the cylinder 31 from the oil passage 17 through the oil passage 41, whereby the piston 32 is raised.

The second sleeve 54 disengages from the cylindrical member 55 is released when the piston 32 rises by a predetermined amount, so that the air nozzle 60 is opened into the air drain space 57.

Figure 5:
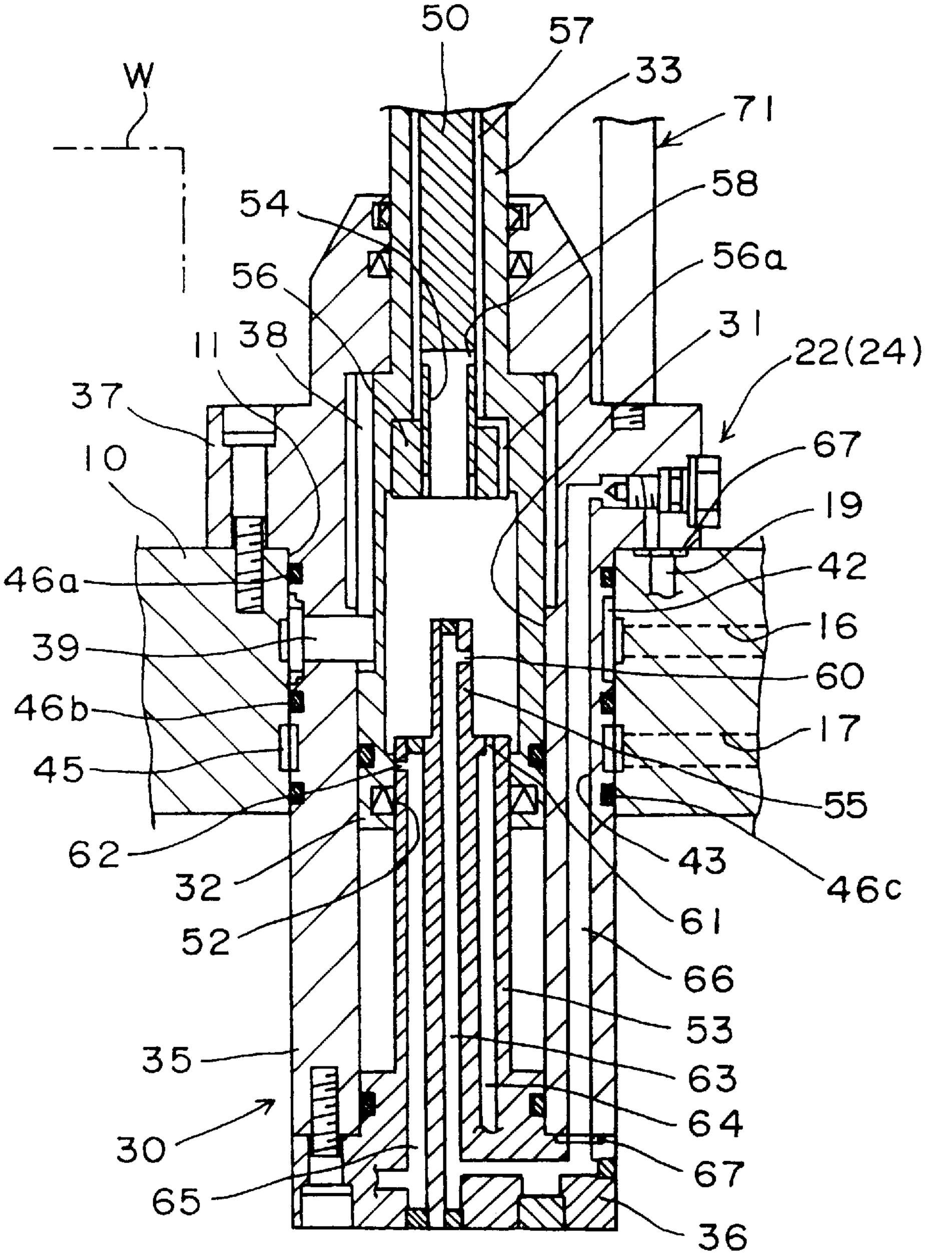
FIG. 5 is a cross-sectional view of the clamping device showing an operation state at an upper position of a piston in the clamping device.

As shown in FIG. 5, when the piston 32 reaches the top end (i.e., the unclamp state) , the air nozzles 62 is closed by the inner surface of the first sleeve 52. Similarly to the clamp operation, when the rising of the piston 32 is accomplished in all of the clamping devices 12, the air pressure switch 27 is operated so that the unclamp operation of the workpiece W is confirmed. In this situation, the remaining air nozzles 60 and 61 are drained by being opened into the air drain space 57, so that the air pressure in the remaining air passages 63 and 64 does not increase, whereby the remaining air pressure switches 25 and 27 are not operated.

The workpiece W is removed after the unclamp operation is confirmed in this manner. When the clamp operation is started in case that the workpiece W is not installed on the fixture base 10, the clamp 34 is retracted to a over-stroke position represented by a double chain line in FIG. 1, past a clamp position represented by a solid line (i.e., the lower end when the workpiece W is normally clamped). At that time, the lower end surface of the contact member 56 contacts an end surface of the first cylindrical member 53 when the second cylindrical member 55 is engaged in the second sleeve 54. In this situation, the air nozzles 61 for detecting the over-stroke operation which opens into an outer surface of the first cylindrical member 53, is closed by the lower end surface of the contact member 56, so that the air pressure switch 27 is operated due to the rising of the air pressure in the air passage 21, whereby the over-stroke operation of the damper 34 is detected.

Next, in case of clamping another workpiece which is different in clamp stroke of the clamp 34, the oil pressure pump unit 14 and the air supply source 18 are initially stopped to stop the supply of a fluid (oil and air) from fluid supply source (i.e., the oil pressure pump unit 14 and the air supply source 18) . In this state, the clamping device 12 is removed from the installing hole 11 by releasing the engagement of the main body 30 with the fixture base 10 by means of a bolt. Thereafter, the main body 30 of a clamping device 12 having an operation stroke corresponding to the next workpiece is secured to the fixture base 10 by means of the bolt again.

Fluid passages (i.e., representing the air passages and the oil passages) in the main body 30 are connected with the fluid passages in the fixture base 10 simply by installing the clamping device 12 into the installing hole 11.

Thus, in the embodiment described above, the cylinder unit for moving the clamp 34 and the detection unit for detecting the completion of the operation can be operated after installing the clamping device 12 into the installing hole 11 of the fixture base 10, so that a change in setup can easily be executed in order to correspond to different workpieces.

Moreover, in case of changing the fixture base 10 itself, it is only necessary to design the layout of the fluid passages and the position of the installing hole 11 in the fixture base 10, so that the design change is facilitated, whereby the time of the design change can be shortened. Accordingly, the mechanism is not complicated, thereby reducing the assembly time.

In this embodiment, the first and second sleeves 52 and 54 are provided in the piston 32 of the cylinder unit, and first and second cylindrical members 53 and 54 are provided in the cylinder cap 36 so as to be slidable with respect to the first and second sleeves 52 and 54. Moreover, the air nozzles 60 and 62 are opened and closed by the first and second sleeves 52 and 54 so as to overlap the piston 32 with respect to the cylinder cap 36, so that the operation end of the clamp 34 can be detected in the piston 32. Therefore, even when a stroke length of the clamp 34 is extended corresponding to a change of the workpiece W, the piston 32 is overlapped with respect to the cylinder cap 36, so that the mechanism of the clamping device 12 can be compact.

The air pressure switch 25 or 27 is operated according to the clamp or unclamp instruction. However, in case that the air pressure switch is not operated due to some other reason, it is required to search which of the clamping device 12 is not operated. In the embodiment described above, the positions of the designating plates 72*a* and 72*b* arranged at the upper end of the piston rod 33 are visually confirmed by the operator with respect to the operating position detection guage 71, so that the clamping device 12 that is not operated normally can be readily detected. In FIG. 4, by closing two of three valves 22 (or 24) which are provided with clamping devices 12 arranged at three portions of the fixture base 10, the malfunctioning clamping device 12 can be detected by the operation state of the air pressure switch 25 (or 27). Therefore, it can be quickly found which of the clamping device 12 is malfunctioning without demounting them.

Furthermore, in the embodiment described above, the operation position of the clamp can be detected in the piston by slidably engaging a part of the cylinder cap with the piston. The present invention can have various modifications which do not detract from the technical idea that the clamping device is composed of the cylinder unit and the detection unit, and that the clamp-unclamp operation and the detection operation can be performed simply by installing the clamping device into the fixture base.

Figure 6:
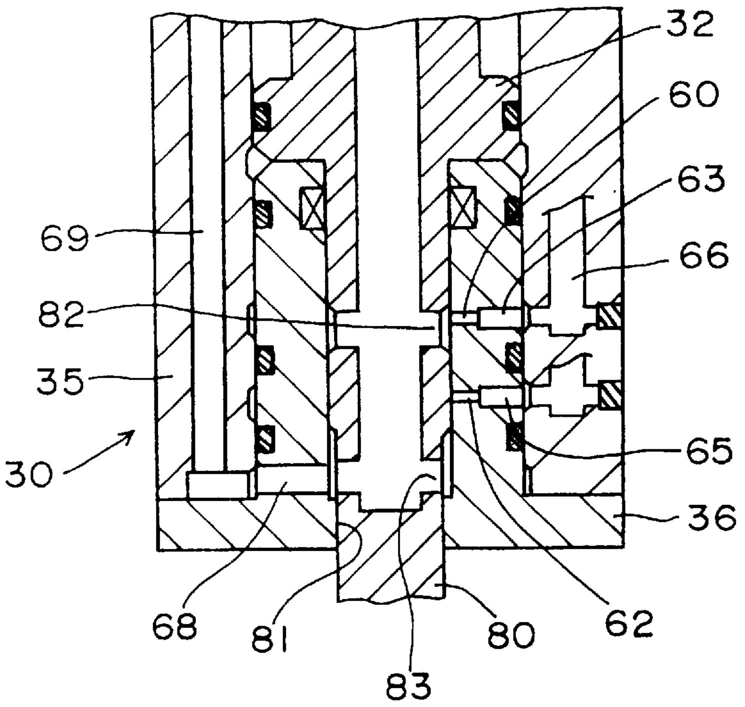
FIG. 6 is a cross-sectional view of a clamping device in a second embodiment according to the present invention.

Namely, as shown in a second embodiment of FIG. 6, a piston rod 80 is formed at a lower end portion of a piston 32. The piston rod 80 slidably extends in a sleeve 81 formed in a cylinder cap 36 in which position detection may be performed. The explanation of the operation and construction which is the same as or similar to the first embodiment is omitted, and the same numbers used for the same as or similar to elements to those in the first embodiment.

In this embodiment, two air nozzles 60 and 62 are formed in the cylinder cap 36 and are separated by a predetermined length with respect to an axial direction of the piston rod 80. The nozzles 60 and 62 are respectively connected with ends of air passages 63 and 65 and open into an outer surface of the piston rod 80. On the other hand, openings 82 and 83 are formed in the piston rod 80 at positions corresponding to the air nozzles 60 and 62 of the cylinder cap 36. In this construction, the openings 82 and 83 are drained through drain passages 68 and 69 formed in a main body 30, respectively. At an operation end of the stroke of the piston rod 80, one of the air nozzles 60 and 62 is closed, and the other thereof is opened, whereby the operation end can be detected.

Figure 7:
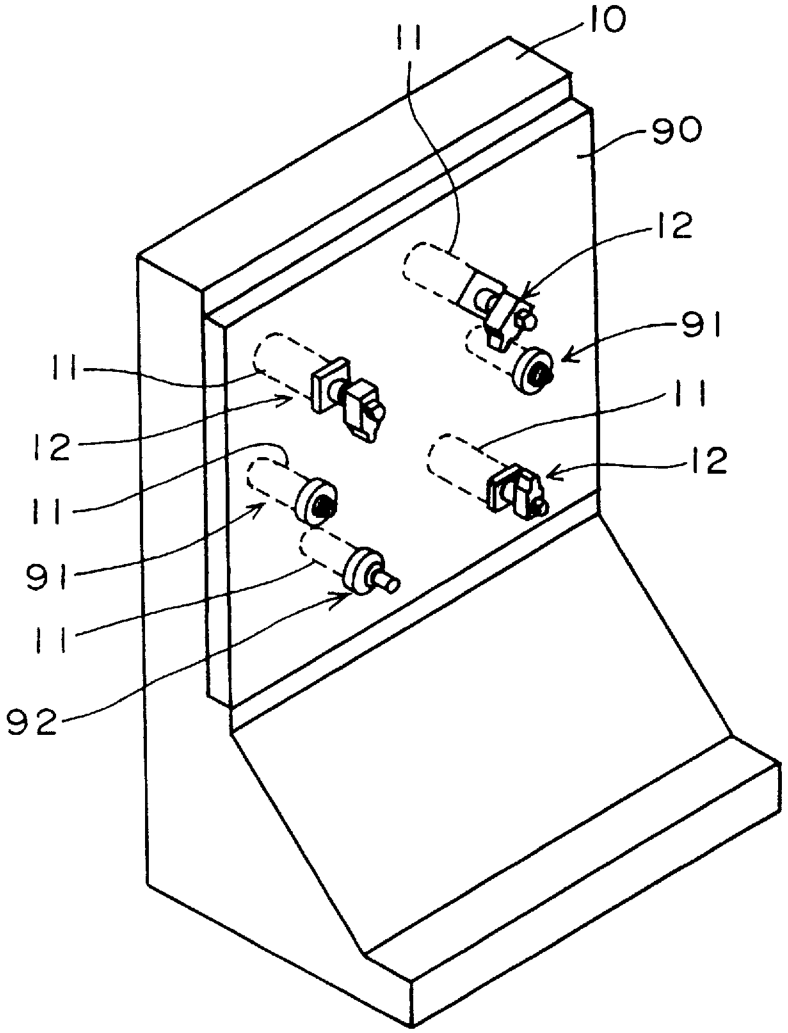
FIG. 7 is a perspective view of a clamping device in an application embodiment according to the present invention.

Next, an application embodiment according to the present invention will be explained with reference to FIG. 7. In this application embodiment, the clamping device 12 according to the present invention is installed on a fixture base 10 via a special plate 90, numeral 91 denotes a knock pin for positioning a workpiece (not shown), and numeral 92 denotes a natural-clamp unit for natural-clamping the workpiece. Similarly to the clamping device according to the present invention, both of the knock pin 91 and the natural-clamp unit 92 are constructed as a unit in which the cylinder unit and the detection unit are self contained. In the special plate 90, air passages and oil passages (both are not shown) are formed so as to be connected to each of a plurality of installing holes 11. Therefore, when the knock pin 91 and the natural-clamp unit 92 are installed into the installing holes 11, the communication in the supply of air and oil from the passages to the both units are respectively established and therefore, each of the units can be operated.

According to this construction, the clamping device 12 according to the present invention including the special plate 90 forming the installing hole 11 in which the clamping device 12 is installed is constructed in the form of unit, so that it is easy to change the setup in correspondence with a different workpiece size and the changing of the position at which the workpiece is provided. Furthermore, it is possible to change the stroke for the clamp merely by changing the clamping device 12. Further, changing the stroke of the knock pin 91 and the natural-clamp unit 92 can be easily performed by simply changing respective units. Therefore, by a combination of the special plate 90, the clamping device 12 according to the present invention and the respective units in the form of units similar to the clamping device, it is easy to adapt to various workpieces having different sizes.

Obviously, numerous modifications and variations of the present invention are possible in light of the above teachings. It is therefore to be understood that within the scope of the appended claims, the invention may be practiced otherwise than as specifically described herein.

What is claimed is:

1. A clamping system for clamping a workpiece, comprising:

a fixture base having at least one installing hole;

a clamping device inserted in each said at least one installing hole;

clamping fluid supplying passages formed in the fixture base for supplying clamping fluid, one end of each of said clamping fluid supplying passages being connected to each said at least one installing hole;

detection fluid supplying passages formed in the fixture base for supplying detection fluid;

a clamping in member;

a cylinder unit formed in said clamping member configured to move said clamping member in directions for clamping and unclamping the workpiece;

a piston movable in said cylinder unit so as to define two fluid chambers for moving said piston;

a detection u nit in said clamping device for detecting operation conditions of the clamping member, said detection unit includes detection fluid passages formed in said clamping device, a plurality of nozzles in said cylinder unit which are to be opened and closed by movements of said piston, and pressure switches for detecting a pressure of the detection fluid in said detection fluid supplying passages formed in said fixture base, wherein one end of each of said detection fluid supplying passages is connected to each of said at least one installing hole, wherein one end of each of said detection fluid passages is connected to one of said nozzles, and wherein other end of each of said detection fluid passages is communicated with said detection fluid supplying passages formed in the fixture base when said clamping device is installed in a respective installing hole; and clamping fluid passages formed in said clamping device, wherein one end of each of said clamping fluid passages is connected to one of said fluid chambers, and wherein other end of each of said clamping fluid passages is communicated with said clamping fluid supplying passages formed in the fixture base when said clamping device is installed in a respective installing hole.

2. A clamping system according to claim 1, wherein the pressure switches include an unclamp detection switch for detecting an unclamp state of the clamping member, a clamp deflection switch for detecting a clamped state thereof, and an over-stroke detection switch for detecting an over-stroke thereof.

3. A clamping system according to claim 1 further comprising;

a sleeve formed in a cylinder cap of said cylinder unit, in which said nozzles are formed;

a piston rod engagable to said sleeve formed at an end portion of said piston of said cylinder unit; and openings formed in said piston rod for communicating said nozzles with said detection fluid passages due to the movement of the piston of said cylinder unit.

4. A clamping system for clamping a workpiece, comprising;

a fixture base having at least one installing hole;

detecting fluid supply passages and clamping fluid supply passages in said fixture base and communicating with each of said installing hole; and clamping devices fittable in said installing hole, each of said clamping devices having a cylinder, a piston mounted in said cylinder, a clamping member for clamping a workpiece, piston position detecting means, clamping fluid passages for supplying a clamping fluid for moving said piston, and detection fluid passages for supplying a detecting fluid for said detecting means, wherein said clamping fluid passages and said detecting fluid passages in each of said clamping devices are positioned to respectively communicate with said clamping fluid supply passages and said detecting fluid supply passages in said fixture base when the clamping devices are fitted in the respective installing holes.

5. A clamping system for clamping a workpiece, comprising:

clamping device means for clamping a workpiece;

fixture base means for providing a working surface for the clamping system, said fixture base means including installation hole means for mounting said clamping device means;

clamping fluid supply means formed in said fixture base means for supplying clamping fluid to said installation hole means;

detection fluid supply means formed in said fixture base means for supplying detection fluid to said installation hole means;

clamping member means for providing a con tact surface for a workpiece;

cylinder unit means for moving said clamping member means in order to clamp and unclamp the workpiece, said cylinder unit means including piston means movable in said cylinder unit means and defining two fluid chambers within said cylinder unit means;

detection unit means provided in said cylinder unit means for detecting a position of said clamping member means, wherein said detection unit means includes detection fluid passage means formed in said cylinder unit means for communicating detection fluid between detection fluid supply means and said piston means, detection nozzle means for opening and closing said detection fluid passage means according to a position of said piston means, and pressure detection means for detecting a pressure of the detection fluid in said detection fluid supply means;

clamping fluid passage means formed in said clamping device means for communicating said clamping fluid supply means formed in said fixture base means with said two fluid chambers.

6. A clamping system according to claim 5, wherein said pressure detection means includes unclamp detection means for detecting a pressure associated with an unclamp state of said clamping member means, clamp detection means for detecting a pressure associated with a clamped position of the clamping member means, and an over-stroke detection means for detecting a pressure associated with an over-stroke position of said clamping member means.

7. A clamping system according to claim 5, further comprising:

bore means formed in a cylinder cap means provided on said cylinder unit means, said bore means including said detection nozzle means;

connection means formed on an end portion of said piston means, for communicating said detection nozzle means with said detection fluid passage means formed in said cylinder unit means according to a position of said piston means.

8. A clamping system for clamping a workpiece, comprising:

fixture base means for providing a working surface for the clamping system, said fixture base means including at least one installation hole means for mounting said clamping device means;

detecting fluid supply means and clamping fluid supply means provided in said fixture base means, wherein said detecting fluid supply means and clamping fluid supply means communicate with each of said installation hole means;

clamping device means fittable in each of said at least one installation hole means, each of said clamping device means including cylinder unit means, piston means provided in said cylinder unit means and a clamping member means for providing a contact surface with a workpiece, piston position detecting means, clamping fluid passage means for supplying clamping fluid for moving said piston means, and detection fluid passages for supplying a detection fluid to said piston position detection means;

wherein said clamping fluid passage means and said detection fluid passage means in said clamping device means communicate with said detecting fluid supply means and clamping fluid supply means provided in said fixture base means when said clamping device means are fitted in said installation hole means.

* * * * *